United States Patent [19]
Minz

[11] Patent Number: 5,480,277
[45] Date of Patent: Jan. 2, 1996

[54] MACHINE FOR TIPPING LARGE INDUSTRIAL ARTICLES

[76] Inventor: Charles A. Minz, P.O. Box 190, Hubbard, Oreg. 97032

[21] Appl. No.: 374,975

[22] Filed: Jan. 19, 1995

[51] Int. Cl.[6] ..................................................... B25J 11/00
[52] U.S. Cl. .............................. 414/778; 414/21; 414/911
[58] Field of Search .......................... 414/21, 778, 789.7, 414/911

[56] References Cited

U.S. PATENT DOCUMENTS

| 3,016,158 | 1/1962 | Horton | 214/652 |
|---|---|---|---|
| 3,263,762 | 8/1966 | Langager et al. | 414/21 |
| 3,736,997 | 6/1973 | Bottorf | 177/145 |
| 3,753,505 | 3/1973 | Ouska | 214/1 QF |
| 3,763,990 | 10/1973 | Ousaka | 198/33 |
| 3,795,323 | 3/1974 | Ousaka | 214/1 Q |
| 4,013,177 | 3/1977 | Kinnicutt et al. | 214/1 |
| 4,155,466 | 5/1979 | Hogenesch | 414/21 |
| 4,718,813 | 1/1988 | Kehlenbach | 414/684 |
| 4,997,330 | 3/1991 | Blezerd | 414/21 |
| 5,330,304 | 7/1994 | Ceridis et al. | 414/21 |

Primary Examiner—Michael S. Huppert
Assistant Examiner—Douglas A. Hess
Attorney, Agent, or Firm—James D. Givnan, Jr.

[57] ABSTRACT

A load receiving platform and cradle are mounted for rotation about a horizontal axis through approximately ninety degrees. A machine base is spaced upwardly from a floor surface by supports which may be embodied in load cells. A load receiving surface of the platform extends along a cantilever portion of the platform. A hydraulic cylinder, coupled to the cantilever portion of the platform, imparts rotational movement thereto. The hydraulic cylinder is part of a hydraulic system having lines communicating cylinder ends with a pressure source. One of the lines includes a piloted valve with fluid flow through the line being regulated by pilot pressure taken from the remaining line to control platform movement during an unbalanced condition of the platform.

6 Claims, 1 Drawing Sheet

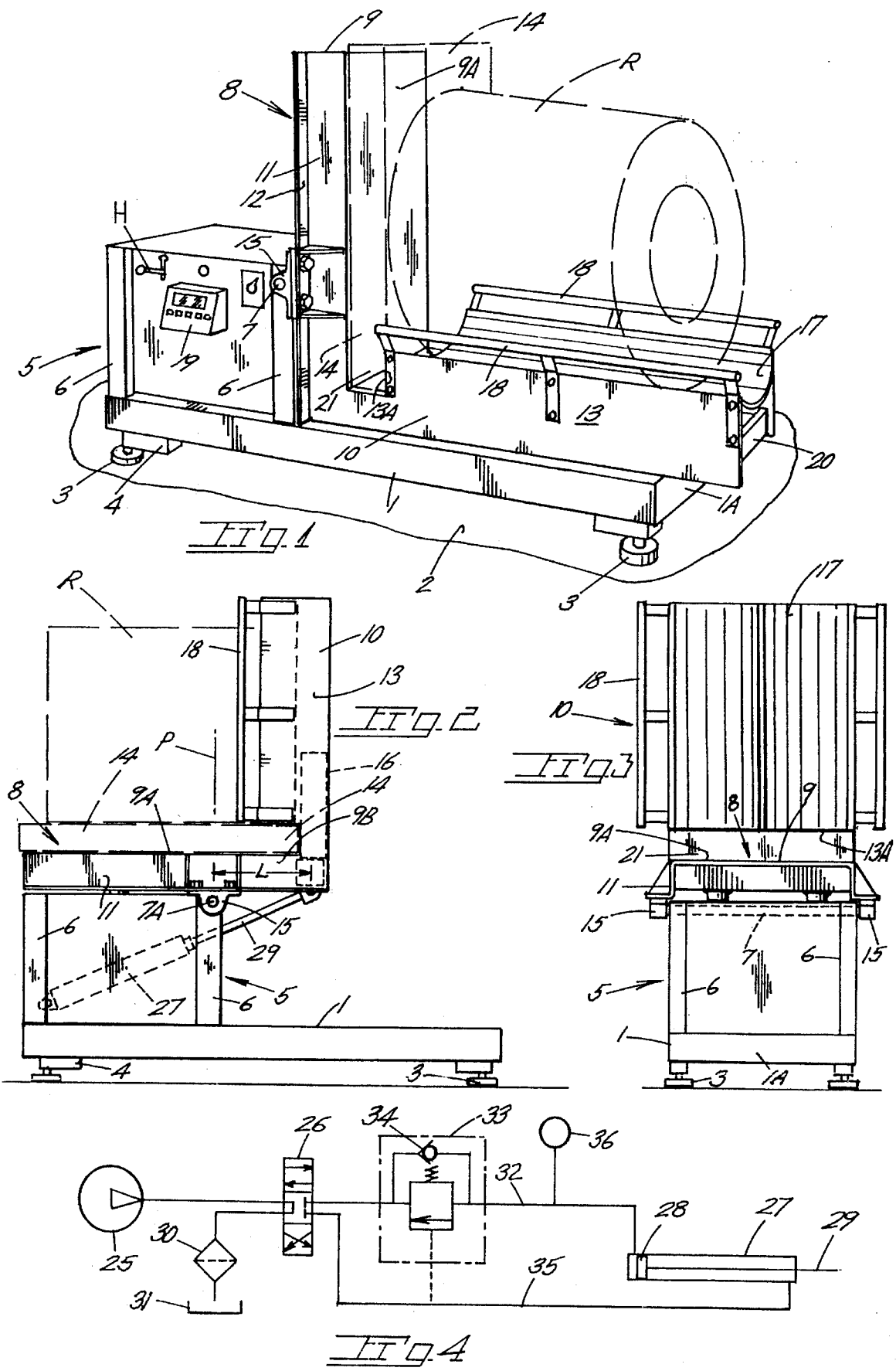

MACHINE FOR TIPPING LARGE INDUSTRIAL ARTICLES

BACKGROUND OF THE INVENTION

The present invention pertains generally to equipment for repositioning heavy articles, such as large rolls of sheet metal, through ninety degrees or so.

Rolls of sheet metal, as used in various manufacturing efforts, may weigh several thousands of pounds. Such rolls must be tipped for lift truck transport, storage and lastly for installation in the equipment forming the sheet metal paid out from the roll.

Toward this end, the prior art includes the machine disclosed in U.S. Pat. No. 3,016,158 which positions a roll of sheet metal in place on a powered platform which rotates about an inclined axis. A cradle is shown offset from the platform. U.S. Pat. Nos. 3,753,505, 3,795,323 and 3,763,990 show a right angular platform and cradle which has arcuate bottom edge which rolls along a track on a machine base to position a roll of sheet metal or other heavy article through ninety degrees. U.S. Pat. No. 4,718,813 shows a cart for carrying and positioning an article on a spindle through ninety degrees. U.S. Pat. No. 4,013,177 discloses a machine for inverting a sheet metal coil through 180 degrees during coil manufacture. U.S. Pat. No. 3,736,997 shows a coil handling apparatus wherein steel coils are tipped through ninety degrees and then transferred momentarily to adjacent weigh beams at 39 supported by load cells at 180 in a walking beam type conveyor shown generally at 40. The prior art fails to disclose a self contained machine for tipping of large articles which may be readily located at a worksite.

SUMMARY OF THE PRESENT INVENTION

The present invention is embodied within a machine for positioning heavy articles through ninety degrees or so and being of a design facilitating positioning of the machine at a worksite within a plant.

The machine includes a platform having a cradle thereon for supporting of the article being handled, as for example, a roll of sheet metal weighing several thousand pounds. Typically such rolls must be transferred from their storage location to a using site whereat the roll must be positioned to the horizontal on an arbor for feeding of the sheet material into a forming machine. The present machine includes a platform and cradle controlled by a hydraulic system assuring controlled positioning of the roll regardless of the platform and the article being in an unbalanced condition during repositioning of the article. Load cells supporting a machine base enable the weighing of a sheet metal roll. The machine base is spaced above a floor surface to facilitate transport of the machine with a small lift truck to various sites within a plant to avoid the task of transferring such articles weighing approximately 4 or 5 times the weight of the machine to a remote point for weighing and positioning. The hydraulic system includes an externally piloted valve in communication with one end of a hydraulic cylinder to control fluid flow from the cylinder to counterbalance the unbalanced platform and article. The piloting pressure for said valve is taken from a line serving the remaining end of the double acting cylinder. Accordingly, during downward movement of the unbalanced platform and article the speed of such will be controlled by fluid pressure in that hydraulic line subject to pump pressure.

Important objectives of the present machine including the provision of a machine for positioning very heavy articles such as rolls of sheet metal with such a machine having an elevated base facilitating transport of the machine to a site within a plant where positioning and/or weighing of heavy articles is to be performed; the provision of a compact machine capable of tipping articles of several thousand pounds in a controlled manner; the provision of a machine which, in addition to serving to tip large heavy articles, may weigh such articles to serve as a portable scale to supplement its article positioning capability; the provision of a machine having a load receiving platform, a portion of which is a cantilever and which provides a lever to lessen the power requirements of a hydraulic system positioning the platform.

BRIEF DESCRIPTION OF THE DRAWINGS

In the accompanying drawings:

FIG. 1 is a perspective view of the present machine with a roll of sheet metal shown in phantom lines;

FIG. 2 is a front elevational view of the machine;

FIG. 3 is a side elevational view taken from the left side of FIG. 2; and FIG. 4 is a hydraulic schematic of the machine hydraulic system.

DETAILED DESCRIPTION OF THE PREFERRED EMBODIMENTS

With continuing attention to the drawings, wherein reference numerals indicate parts similarly identified below, the reference numeral 1 indicates a base of the present machine which may be formed from a steel plate formed into channels along its lengthwise edges and suitably braced by crosswise extending stiffeners at suitable intervals. Box beam segments 1A close the base ends.

Base 1 is spaced from a floor surface 2 by feet 3 which are preferably components of load cells 4, one each located at a corner of the rectangular shaped base. Accordingly base 1 is spaced upwardly from floor surface 2 to permit the passage of a lifting instrumentality such as lift forks therebelow to render the present machine portable for transfer to a site within a plant. An enclosure indicated generally at 5, in place on base 1, serves to house various components of a later described hydraulic system. Enclosure 5 includes pairs of posts 6 with an innermost pair supporting a horizontal crosswise shaft 7 about which a later described platform rocks. A scale readout device is at 19.

Indicated generally at 8 is a platform including a platform proper at 9 and a perpendicular cradle assembly 10 carried by platform 9. Platform 9 is formed with walls as at 11 therealong with stiffeners interposed between said walls. Flanges at 12 extend along the platform sides with each having a pillow block type bearing 15 in place on the flange underside to receive fixedly mounted shaft 7. The axis 7A of shaft 7 lies in verticle plane P which intersects a load support surface 9A of platform 9 when same is in the horizontal position shown in broken lines in FIG. 2. A roll R or other article on the platform will have a portion of its weight offset toward cradle 10 from plane P to facilitate tipping of the article. Toward this objective a load receiving portion of platform 9 is a cantilever 9B. A later described hydraulic cylinder is coupled to the distal end of the cantilever and results in providing a lever at L which, along with the roll or other load being partially supported by the cantilever, facilitates initial tipping of same. Cradle 10 is of steel plate construction providing side walls at 13 with the side walls terminating at edges 13A offset from the load bearing surface 9A of platform 9. The resulting open area 21 receives the leading edge of a pallet 14 when the platform is disposed per FIG. 2 for reception of an upright roll of sheet metal. For reinforcement purposes that end of cradle 10 located proximate platform 9 is reinforced by an internal box structure 16. A load receiving cradle wall 17 is shown having a curved surface to receive a roll R but may be of other configurations. Side rails at 18 in place on the cradle permit strapping of a roll R, or other article, to the cradle. Cradle wall 17 extends lengthwise of the cradle and terminates at an inner end in welded securement to box 16 while its distal end is supported by a cross member 20.

A hydraulic system provides positioning means for the present machine and is housed within enclosure 5 and includes an electric motor and pump unit 25 serving a four way valve 26 manually actuated by a handle H (FIG. 1) for direction of fluid to the ends of a double acting cylinder 27 having a piston 28 and piston rod 29. A filter is at 30 while a reservoir is at 31. A first hydraulic line 32, in communication with valve 26 and cylinder 27 and with an externally piloted valve 33. Accordingly fluid from pump 25 is directed via valves 26 and 33 to the base end of cylinder 27 with a check valve 34 permitting bypassing of the pilot operated valve component of valve 33. Fluid exhausted from cylinder 27 is routed via a second hydraulic line 35 via operator controlled valve 26 to reservoir 31. The above flow sequence occurs during lifting of the cradle 13 to lift roll R, or other article, to a position above enclosure 5 in place on platform 9. Oppositely, return of cradle 10 to the FIG. 1 position, cylinder 27 will be actuated to retract piston rod 29, by the operator repositioning valve 26 to direct pump output, via line 35, to the rod end of the cylinder. During piston travel the center of gravity of roll R passes vertical plane P, containing the axis of shaft 7, resulting in the load being out of balance and the cylinder serving to function as a counterbalance against the gravitational movement of the platform and load. In this condition fluid discharged from the base end of cylinder 27 by piston 28 will be blocked by pilot operated valve 33 until pressure in hydraulic line 35 builds under pump pressure to a level to crack valve 33. Piston movement in cylinder 27, during lowering of cradle 10, is inhibited by the reduced pressure in the rod end of the cylinder. At least partial closing of pilot operated valve 33 occurs until such time as fluid pressure produced by pump 25 rebuilds in line 35. Control valve 26 includes the feature of a pressure release detent wherein hydraulic pressure above a certain level will result in valve 26 automatically centering to block both lines 32 and 34 with pump output being dumped to reservoir 31. A fluid pressure gauge is at 36.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

1. A machine for tipping an article comprising, a base including support means for spacing the base from a floor surface to provide an open area to enable the insertion of a lifting instrumentality, a support structure on said base, shaft means carried by said support structure, a platform and cradle, the latter perpendicularly disposed on said platform, said platform and cradle carried by said shaft means, said platform having a load receiving surface intersected by a vertical plane containing the major axis of said shaft means about which the platform and cradle are positionable, said platform and cradle having a quadrantal range of travel about said shaft means with the load receiving surface of the platform and an article thereon being in an unbalanced condition during at least a portion of said travel, and positioning means coupled to one end of said platform and to said base including a double acting hydraulic cylinder having its rod end and its base end coupled to said platform and said base, a fluid pressure source, first and second hydraulic lines serving said rod end and said base end of said cylinder, valve means controlling fluid flow to said cylinder, an externally piloted valve in one of said lines and responsive to fluid pressure in other of said lines to regulate said fluid flow through said one of said lines and hence fluid discharge from the cylinder when the platform is in said unbalanced condition to counterbalance article weight.

2. The machine claimed in claim 1 wherein said support means includes load cells in circuit with a readout device to permit weighing of the article.

3. machine claimed in claim 1 wherein said platform has a portion constituting a cantilever of fixed length, said hydraulic cylinder coupled to said portion.

4. A machine for the weighing of an article and repositioning the article about a horizontal axis, said machine comprising, a base including load cells having feet for contact with a floor surface, said load cells additionally serving to space the base from said floor surface to facilitate the insertion of a lifting instrumentality below said base, a support structure on said base including shaft means containing said horizontal axis, a platform for the reception of the article, a cradle perpendicularly disposed on said platform, said platform and said cradle supported by said shaft means for quadrantal movement about said horizontal axis, said platform having a load support surface intersected when horizontal by a vertical plane containing said horizontal axis, positioning means coupled to said platform adjacent one end of the platform to said base, and that portion of said platform delineated by said vertical plane and said one end of the platform serving as a lever to facilitate positioning of the platform by said positioning means.

5. The machine claimed in claim 4 wherein said positioning means is a double acting hydraulic cylinder, first and second hydraulic lines serving said cylinder, an externally piloted valve in communication with one of said lines and piloted by fluid pressure in the other of said lines to inhibit fluid discharge from the cylinder so as to counterbalance the platform and a load thereon when said load thereon is in an unbalanced condition.

6. The machine claimed in claim 4 wherein the article is on a pallet, said cradle terminates in an offset manner from said platform to define an open area in which a portion of the pallet may be received.

\* \* \* \* \*